United States Patent [19]

Walter et al.

[11] Patent Number: 5,019,170

[45] Date of Patent: May 28, 1991

[54] COATED FREE AGGREGATE USABLE IN WOOD CONCRETE TECHNOLOGY AND METHOD OF MAKING THE SAME

[75] Inventors: Hansruedi Walter; Leni M. Walter-Gurzeler, both of Windsor, S.C.

[73] Assignee: Insul Holz-Beton Systems Incorp., Windsor, S.C.

[21] Appl. No.: 406,445

[22] Filed: Sep. 13, 1989

[51] Int. Cl.$^5$ .............................................. C04B 20/10
[52] U.S. Cl. ...................................... 106/805; 106/33
[58] Field of Search .................. 106/99, 805; 501/144

[56] References Cited

U.S. PATENT DOCUMENTS 4,308,068 12/1981 Copling ................................. 106/76

*Primary Examiner*—William R. Dixon, Jr.
*Assistant Examiner*—Alan Wright
*Attorney, Agent, or Firm*—Oblon, Spivac, McClelland, Maier & Neustadt

[57] ABSTRACT

A free aggregate usable in forming wood concrete products is formed of a plurality of individual wood pinchips encased in kaolin to a degree sufficient to seal in water soluble "cement poisons" held in the pores of the chips, while maintaining the individual chips in a free aggregate form. The product is formed by a process which includes the step of encasing the individual particles with a mineralizing coating of the kaolin to a degree sufficient to seal in the water soluble cement poisons. As a preliminary step, the pores of the chips are sealed with an aluminum sulphate-water solution. Once cured, the chips are dimensionally stable, will not deteriorate and are not easily influenced by environmental conditions. Moreover, since the cement poisons are sealed within the chips, they cannot leach out to suppress hardening of a portland cement mix into which the chips may be introduced to form an aggregate in the formation of wood concrete products.

10 Claims, No Drawings

COATED FREE AGGREGATE USABLE IN WOOD CONCRETE TECHNOLOGY AND METHOD OF MAKING THE SAME

BACKGROUND OF THE INVENTION

Practically unknown in the USA, the Wood Concrete Technology (WCT) has been well established in Europe and other continents for more than 45 years. Most of the industrial timber grows in the Southeastern and Southern part of the U.S. Those fast growing subtropical wood species with their high density are considered difficult and/or not suitable for use in the WCT.

SUMMARY OF THE INVENTION

An object of this invention is to impregnate the wood particles to avoid the reactions of the "cement inhibitors" after the mixing process. By doing so, the cement encasement of the pinchips can be achieved and the Wood Concrete Product (WCP) has the desired dimensional stability in all stages of production and as building material.

In order to carry out the invention, a treatment, known as a K-X treatment, includes the selection and shaping of the pinchips before they are blended with an aluminum sulphate solution for obtaining the filling of the pores. Although this aluminum sulphate solution has been used in Europe to treat the less dense northern wood, it does not give the satisfactory long lasting results needed with the southern wood species. Therefore, the invention includes the complete containment of the cement poisons in the individual pinchips by encasing a free aggregate of the individual with kaolin powder when the pinchips chips are very green or moist and with kaolin-water emulsion when their U-Value is lower. The finely ground kaolin helps the cement and water to form a homogeneous mix, and acts as an accelerating admixture when the aggregate is subsequently mixed with the cement to form WCP. The fictile K-X mix helps to deliver the "green brick" with the desired dimensional stability and a faster hardening of the product, two factors very important for a profitable manufacturing and high quality of WCP.

More particularly, the present invention includes a free aggregate usable in forming wood concrete products, comprising a plurality of individual particles of fibrous organic material, and an inorganic mineralizing coating encasing the individual particles to a degree sufficient to seal in water soluble organic matter held in the pores of the particles while maintaining the individual particles in a free aggregate form.

The process of the invention includes producing a coated free aggregate usable in forming wood concrete products comprising the steps of forming a free aggregate of fibrous organic products and encasing the individual particles with an inorganic mineralizing coating to a degree sufficient to seal in water soluble organic matter held in pores of the particles, while maintaining the individual particles in a free aggregate form. The K-X treated WCP will not rot or decay, is termite and vermin proof, highly fire resistant, and can be exposed to any kind of weather and environmental stress without shrinking or expansion of the product (naturally in accordance with the manufacturing design specification). We define the pin chips' K-X treatment, a synergistic reaction with the cement encasement, as the transposition of an organic substance into a state of mineralization in which it becomes a constant with regard to biological and meteorological influences and with regard to fire, as a mineral building material. Mineralization is neither a chemical nor a biological process.

DETAILED DESCRIPTION OF THE INVENTION

Wood processing

After screening, the larger pinchips are recycled and the very fine dust is eliminated because sawdust absorbes too much cement. The ideal size of the pine or hardwood pinchips for the manufacture of Permanement Wallforms (WF's) is 1/32"-¼" in diameter and 3/16"-¾" in length. Coarser shaped chips are used for the panelheart in the wood concrete (WC) panel production. Dirt, cinder, char, blue stain chips have been eliminated before being delivered to the plant. Red heart pin chips must comprise not more than 20%. The bark content shall be less than 3%. Material with strong odor of mildew and in a state of fermentation should be avoided. The ideal moisture content of the pinchips is U=28%-40%. In this case the K-X treatment has 2-3 stages. Greener and very moist pinchips with a moisture content up to U-80% will be treated in 2 stages. K-X treated pinchips can be shipped in bulk and the aggregate will not alter for months.

Treatment with aluminum sulphate-water solution

In the first stage treatment of pinchips with a moisture content of not over U-40%, the wood particle have up to 80%-90% of their volume as cavities and pores and only 10% of structural cellulose material. There is enormous space therein whihc have the water soluble carbohydrates which we generally call cement poisons.

The principal "cement poisons" contained in southern pine, growing area: Southeastern and southern USA, are approximately as follows:

| | |
|---|---|
| Sugar | 1.0–1.5% in weight |
| Tannin | 0.5–0.6% in weight |
| Oils and Resins | 4.2–4.4% in weight |

These values can differ depending on seasons and regions.

The PH is 4.2–4.5 on the acid side of the PH scale.

Cellulose structure and water are the other components.

The aluminum sulphate-water solution is well known in WCT and this treatment of the pinchips has the task of closing the particle pores and cavities now filled with cement poisons and moisture. Depending on the quality of the wood and the content of cement poisons and moisture, the $Al_2(SO_4)_3$ has a ratio of 1½–2% of to the amount of Portland cement used in a conventional cement mix and is diluted with 7–8 parts of water. A thorough mixing of the aggregate is important. For moist and greener pinchips over U=40% we use a 1% $Al_2(SO_4)_3$ solution diluted with only 3–4 parts of $H_2O$. This pretreatment has a shocking, closing effect on the pores and helps to hold back the cement poisons until they can be contained in the particle by the K-X casing.

The K-X Treatment second stage

This second stage process with Kaolin ($Al_2O_3 \cdot 2SiO_2$) will make the desired balanced, homogeneous wood concrete mixture with Southern pine chip aggregate have the a synergetic effect during production and give outstanding physical characteristics the WCP.

To the first stage treatment we add the kaolin-water solution with drier aggregate (under U-40%) and to the greener moist aggregate (up to U-80%) we add the fine kaolin powder with a content of over 68% of particles smaller than 3 microns.

The typical particle size distribution of kaolin type:

| ALBION Pulverized Form 100 | |
| --- | --- |
| Wt. less than 10 microns | 94.1% |
| Wt. less than 5 microns | 80.0% |
| Wt. less than 2 microns | 62.1% |
| Wt. less than 1 micron | 43.8% |
| Wt. less than 0.5 micron | 28.2% |

The weight of the kaolin in the kaolin emulsion is only 3-5% of the weight of Portland cement in a solution of cement powder in water, depending on the moisture of the aggregate, it is thoroughly mixed so every single pinchip gets sheathed. This casing will be a long lasting impregnation of the pin chips and will maintain the material stability of the wood. The K-X treatment makes swelling, shrinking and decaying of the wood particle impossible because of the mineralization effect together with the cement encasement.

The particle size distribution of the kaolin is finer than in the average Portland cement (28.5-47% less than particle size 10 microns) provking as a physical effect as a merging and accelerating admixture and acting as a uniform distributor of the cement in the mix when the coated particles are subsequently mixed with a portland cement/water solution for forming WCP, resulting in a more glutinous mass. This colloidal mixture with kaolin and Portland cement creates a better and larger contact surface in between the now encased aggregate particles creating not only a fictile mix feature, but also a better delivery of the green brick (WF or panel cake). The dimensional stability, faster hardening and hydration during the production phase brings automatically a greater strength of the WCP.

The positive influence of the use of kaolin in the K-X treatment makes the use of difficult or not suitable wood or other fibers not only feasible, but, through its major strength and longevity, creates opportunities for new applications of the WCT in the field of healthier building materials. The K-X treatment gives the WCP a higher fire-rating: 3-4 hours and more are possible. The preservation qualities of the K-X treatment of the Southern pine and other fibers makes the long shipment periods of huge (bulk) quantities overseas without signs of decomposition feasible. This makes using chips out of difficult or not suitable timber species more practicable for the manufacturing of wood concrete products on other continents.

Once the K-X treatment particles are mixed with a portland cement mix to form WCP, the freshly molded green bricks (wallforms, slab forms and panels) have a relatively short hardening time due to the locking in of the cement poisons in the encased particles so that the elements can be handled easily after 24 hours for further processing. This K-X process not only makes the southern pine chips suitable for cost effective manufacturing but reduces significantly the material cost (less cement needed) and production time, very important factors for an economical and competitive product.

Third stage

The stage three treatment is used when the fire-rating of the WCP has to be emphasized. We add to the stage two treatment a waterglass-water solution which will vary from 2-3% sodium silicate WW33 as compared to the weight of Portland cement in a conventional solution, diluted with 3-5 parts of a water (assuming an initial moisture content of 28%-40%). This third stage depends on the wood material quality and the WCP design.

Other fibrous organic materials usable as the particles in the K-X treatment include a straw, reed, bamboo, peanut shells, other nut shells and rice hulls, although this list is not exclusive.

If the pinchips are very dry (moisture content of less than 28%), they should be slightly moistened prior to the treatment according to the invention.

The K-X treated material can be shipped as bulk aggregate to other plants independent of weather and environmental influence. It has better dimensional stability and faster hardening with a dynamic hydration (peak: 48° C. in 10-14 hours) resulting in a greater strength in the product.

Due to the accelerated hardening of the WCP, and the supplementary strength of the product during the production process and handling, there is less waste. The K-X treatment makes WCP more cost effective in manufacturing.

Due to the K-X treatment, new product designs for outdoor panels and slab ceilings can be encouraged because the K-X treatment gives product longevity and durability. Additionally, when combined with the third stage of treatment, fire resistance of the WCP can be four hours or more. One can use the second stage treatment only, without the use of the first stage, for very moist chips and fiber in soft and hard wood, or other specific organic fibers, especially when the chips are coarse. There, kaolin in powder form or kaolin milk is added to the aggregate with a concentration of 5-10% of the weight of cement in a portland cement mix. This mixture is very thoroughly mixed for a minimum of 5 minutes.

Of course, the K-X treated particles can be used in environments other than wood concrete technology. For example, they can be used in tennis courts, running tracks, etc.

We claim:

1. A free aggregate usable in forming wood concrete products, comprising:

a plurality of individual chips of fibrous organic material; and an inorganic mineralizing coating encasing said individual chips to a degree sufficient to seal in water soluble organic matter held in the pores of said chips and prevent the leaching thereof, while maintaining said individual chips in a free aggregate form.

2. The free aggregate of claim 1 wherein said chips comprise wood pinchips.

3. The free aggregate of claim 2 wherein said coating is a dried layer comprising kaolin.

4. A process for producing a coated free aggregate usable in forming wood concrete products, comprising the steps of:

forming a free aggregate of chips of fibrous organic products; and encasing the individual chips with an inorganic mineralizing coating to a degree sufficient to seal in water soluble organic matter held in pores of said chips to prevent the leaching thereof while maintaining said individual chips in a free aggregate form.

5. The process of claim 4 wherein said chips comprise wood pinchips.

6. The process of claim 4 including the step of sealing said pores with an aluminum sulphate-water solution prior to said encasing step.

7. The process of claim 4 wherein said encasing step comprises mixing the chips with an aqueous solution containing kaolin particles, and permitting the water in said aqueous solution to dry so that the kaolin forms the mineralizing coating.

8. The process of claim 7 wherein the kaolin particles in the aqueous solution have a size and concentration less than that of cement particles in a portland cement mix.

9. The process of claim 4 including a fireproofing step of mixing the encased particles with a waterglass-water solution containing sodium silicate WW33.

10. The process of claim 4 including the step of mixing the encased particles with a portland cement mix to form wood concrete products.

* * * * *